Aug. 8, 1950     R. R. MILLER     2,517,910
POWER TRANSMITTING ATTACHMENT
Filed Feb. 23, 1949
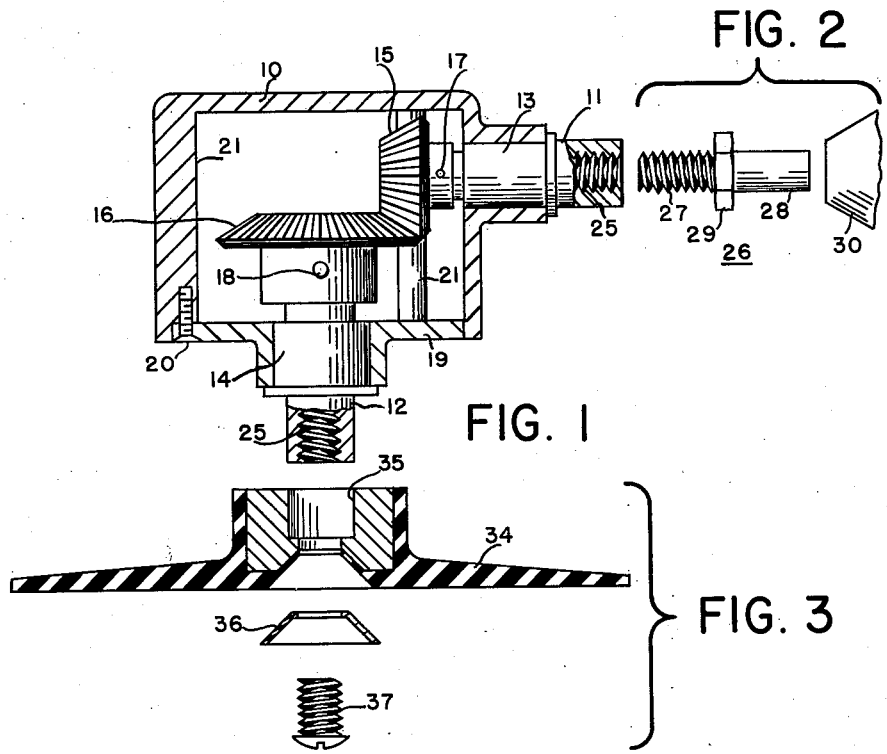
INVENTOR.
Robert R. Miller
BY
Hoodling and Krost
attys.

Patented Aug. 8, 1950

2,517,910

UNITED STATES PATENT OFFICE 2,517,910

POWER-TRANSMITTING ATTACHMENT

Robert R. Miller, Cleveland, Ohio

Application February 23, 1949, Serial No. 77,775

2 Claims. (Cl. 74—417)

The invention relates to a power transmitting attachment for driving a tool and more particularly to a right-angle attachment which provides two speed operation to the tool.

An object of the invention is the provision of a power transmitting attachment for driving a tool in which the attachment is provided with gearing having other than a one-to-one gear ratio and in which the attachment may be reversibly connected end-to-end between the driving motor and the tool to give two speed operation to the tool.

Another object of the invention is the provision of a power transmitting attachment in which the attachment has two shafts with identical connection means, whereby the driving motor and the tool may be interchangeably interconnected to either shaft.

Another object of the invention is the provision of an adapter element which connects the driving motor to either one of the two shafts of the power transmitting attachment and in which the adapter element has threads that are identical to the threads on the fastening means that connects the tool to either one of the two shafts.

Other objects and a fuller understanding of the invention may be had by referring to the following description and claims, taken in conjunction with the accompanying drawing, in which:

Figure 1 is a cross sectional view of a power transmitting attachment embodying the features of the invention;

Figure 2 is a side fragmentary view of a driving chuck and a side view of an adapter element which is adapted to interconnect the driving chuck to either one of the two shafts of the power transmitting attachment;

Figure 3 is an exploded view of a buffing wheel and the fastening means therefore, illustrating the fact that the buffing wheel may be interchangeably connected to either one of the two shafts of the power transmitting attachment; and Figure 4 is a bottom plan view of the attachment shown in Figure 1.

With reference to the drawings, the invention comprises a housing 10 having two shafts 11 and 12 rotatively mounted thereon by bearings 13 and 14 respectively. Attached to the inner end of the shaft 11 is a bevel gear 15. Any suitable means may be employed for attaching the bevel gear 15 to the inner end of the shaft 11, such for example as by means of a pin 17. A bevel gear 16 is attached to the inner end of the shaft 12 by means of a pin 18. As illustrated, the bevel gear 15 is smaller in diameter than the bevel gear 16 so that the bevel gear assembly provides a gear ratio other than a ratio of one-to-one. The bearing 13 in which the shaft 11 rotates is mounted in the side of the housing. The bearing 14 in which the shaft 12 rotates is mounted in a cover plate 19 held in position by means of screws 20 which threadably extend into threaded openings provided in ribs 21 formed as an integral part of the inside wall of the housing.

The outer ends of the shafts 11 and 12 are provided with identical female threads 25. An adapter element 26 is provided for interchangeably connecting the driving chuck 30 to either one of the two shafts 12 and 13. As illustrated, the adapter 26 has at one end thereof male threads 27 for threadably engaging the female threads 25 of either one of the two shafts and has at the other end thereof a shank 28 which may be engaged by a driving chuck 30 driven by an electric motor, such for example as used to drive a drill. Intermediate the male threads 27 and the shank 28 is a hexagonal nut 29 which operates not only as a nut to turn the adapter element onto the shaft but also as a stop to limit the extent that the adapter element may be screwed into the shaft. The threads 27 are right-hand threads, so that the harder the motor turns the stronger the male threads 27 are turned into the female threads 25.

A buffing wheel 34 is adapted to be fastened to the outer end of either one of the two shafts 11 and 12 by means of a cone-shaped washer 36 and a screw 37 which screws into the female threads 25 in either one of the two shafts. The buffing wheel is provided with a socket 35 that is adapted to receive the outer end of either one of the two shafts 11 and 12. In operation, the buffing wheel 34 may have attached to the face thereof a sheet of sand paper or a buffing or polishing disc or bonnet made of suitable polishing or buffing material. The male threads of the screw 37 are right-hand threads and are identical to the male threads 27 of the adapter element 26. Being right-hand threads, the male threads 27 and 37 turn on tighter as the buffing wheel is operated by a clockwise rotation of the driving chuck. When it is desired to run the buffing wheel at a reduced speed from that of the driving chuck 30, the adapter element 26 is threadably connected to the shaft 11 and the buffing wheel 34 is attached to the shaft 12. When it is desired to operate the buffing wheel at a greater speed than the speed of the driving chuck 30, then the adapter element 26 is threadably connected to the shaft 12 and the buffing wheel 34 is connected to the shaft 11. Inasmuch as the driving chuck and the buffing wheel may be interchangeably connected to the shafts 11 and 12 my power transmitting attachment provides for giving two speed operation to the buffing wheel with only a single set of gears. No shifting of gears is necessary to obtain two speed operation. To change from one speed to another, it is only necessary for the operator to reversibly connect the attachment end-to-end between the driving chuck 30 and the buffing wheel 34.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A right-angle power transmitting attachment for driving a tool comprising, a housing, first and second shafts rotatively mounted in said housing and disposed at substantially a right angle to each other, first and second intermeshing gear wheels of different diameters having their axes disposed at substantially a right angle to each other and being mounted respectively on the inner ends of said shafts in said housing, said gear wheels transmitting torque from either one of said shafts to the other and driving the latter at a different rotational speed than the former, said first and second shafts extending externally of said housing and each having screw threads at its outer end portion, an adapter element having at one end thereof screw threads for interchangeably engaging the screw threads at the outer end portions of either of said shafts and having at the other end thereof a shank adapted to be driven by a driving motor, and tool fastening means including a threadable element for interchangeably engaging the screw threads at the outer end portions of either of said shafts.

2. A right-angle power transmitting attachment for driving a tool comprising, a housing, first and second shafts rotatively mounted in said housing and disposed at substantially a right angle to each other, first and second intermeshing gear wheels of different diameters having their axes disposed at substantially a right angle to each other and being mounted respectively on the inner ends of said shafts in said housing, said gear wheels transmitting torque from either one of said shafts to the other and driving the latter at a different rotational speed than the former, said first and second shafts extending externally of said housing and each having female screw threads in its outer end portion, an adapter element having at one end thereof male screw threads for interchangeably engaging the female screw threads in the outer end portions of either of said shafts and having at the other end thereof a shank adapted to be driven by a driving motor, and tool fastening means including a male threadable element for interchangeably engaging the female screw threads in the outer end portions of either of said shafts.

ROBERT R. MILLER.

REFERENCES CITED

The following references are of record in the file of this patent:

UNITED STATES PATENTS

| Number | Name | Date |
|---|---|---|
| 1,225,102 | Banks | May 8, 1917 |
| 1,401,780 | Hensel | Dec. 27, 1921 |
| 1,774,618 | Thompson | Sept. 2, 1930 |
| 1,815,032 | Boughton | July 21, 1931 |
| 2,252,967 | Forton | Aug. 19, 1941 |
| 2,302,853 | Gordon | Nov. 24, 1942 |
| 2,441,722 | Schultz | May 18, 1948 |